Oct. 15, 1963        S. GUARNASCHELLI        3,107,107
ROTARY SWIVEL FLUID COUPLING
Filed Aug. 22, 1960
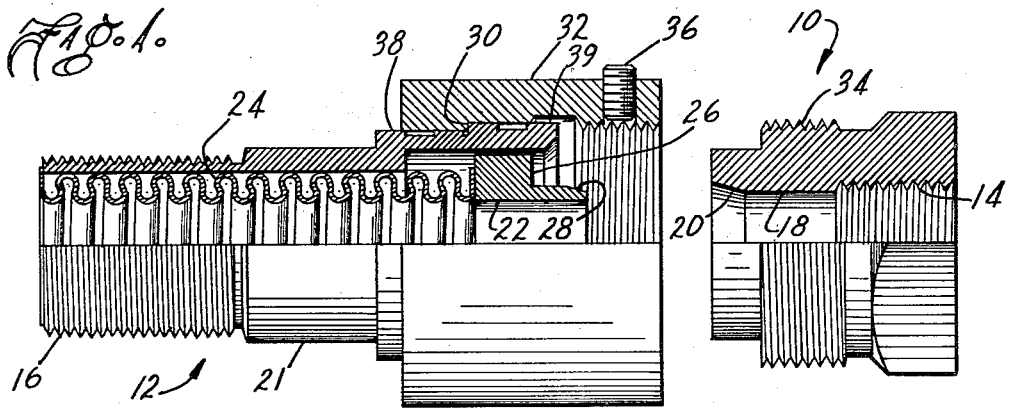
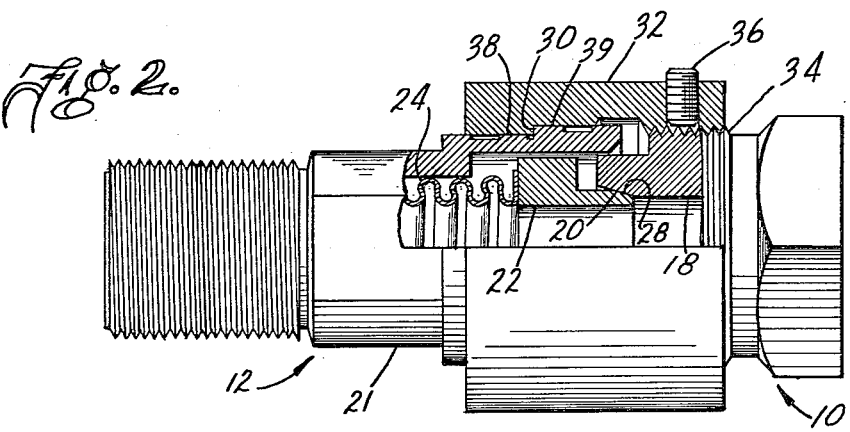
INVENTOR.
Stephen Guarnaschelli
BY Chapin & Neal
    Attorneys 3,107,107
ROTARY SWIVEL FLUID COUPLING
Stephen Guarnaschelli, Garden City, N.Y., assignor, by mesne assignments, to Atlas Corporation, Kings County, N.Y., a corporation of Delaware
Filed Aug. 22, 1960, Ser. No. 50,974
1 Claim. (Cl. 285—275)

The present invention relates to an improved fluid coupling of the rotary swivel type for flexible pipe or hose.

Swivel couplings to connect a pair of fluid conduits for relative rotation are widely used and well known and are of many forms. A common use for such couplings is in joining a flexible hose to a rigid or relatively fixed pipe or other fixed connection such as in a hydraulic system where pressurized fluid is conveyed to fluid motors which are mounted on moving elements of a machine.

The object of the present invention is to provide a relatively inexpensive coupling of the swivel type which will effectively maintain its seal over long periods of use and have improved sealing ability under fluctuating pressure conditions as compared to conventional swivel couplings.

The coupling or swivel of the present invention is characterized by two swivel portions which are adapted to be rotatably joined together. Each of the portions has a passageway therethrough with one of the portions having at the end of its passageway a conical seat which has an angle preferably between 15° and 30° relative to the axis of its passageway. The other of the swivel portions has a sealing member at the end of its passageway with the sealing member having a conical surface matching and engageable with the seat of the first portion to form a continuous sealed passageway through the swivel. The swivel is particularly characterized by a bellows-like conduit defining, at least in part, one of the passageways and urging the seat and sealing member into sealing engagement.

The above and other related objects and features of the invention will be apparent from a reading of the following description of the disclosure found in the accompanying drawing and the particular novelty thereof pointed out in the appended claim.

In the drawing:

FIG. 1 is a view partially in longitudinal section showing the two portions of a swivel embodying the present invention as they would be positioned preparatory to being joined; and FIG. 2 is a view partially in longitudinal section showing the two halves of the swivel joined for use.

Referring to the drawings, swivel portions 10 and 12 are separately shown in FIG. 1. Swivel portion 10 is provided with a female thread portion 14 which may be used in attaching the swivel portion 10 to a tank, pipe or whatever fluid conduit the swivel is to be used with. The swivel portion 12 is provided with a male thread portion at 16 which can be used for the same purposes in joining the swivel portion to a fluid conduit. The male and female threaded portions 14 and 16 are merely illustrative of how the two portions of the swivel may be joined to a fluid conduit, and can be varied in many ways to suit whatever installation problems may be encountered.

The swivel portion 10 has a passageway 18 therethrough which is, in part, defined by the threaded portion 14. At the end of the passageway 18 is a conical seat 20 which has an angle relative to the axis of the passageway 18 between 15° and 30°. It has, however, been found preferable that this angle approximate 15°.

The swivel portion 12 comprises a tubular member 21 on which the threaded portion 16 is formed. A passageway 22 extends through the portion 12 and is defined, in part, by a bellows-like metal conduit 24. The conduit 24 is herein illustrated as a deeply corrugated metal tube having resilient properties. One end of the conduit 24 is joined by brazing to the outer end of the threaded portion 16, thereby defining one end of the passageway 22. The other end of the conduit 24 is joined by brazing to a sealing member 26. The sealing member 26 has a sealing surface 28 at its end, which also defines the end of the passageway 22. The sealing surface 28 has the same angle relative to the axis of the passageway 22 as the seat 20 has relative to the axis of the passageway 18. This is to say an angle between 15° and 30°, and preferably in the order of 15°. It will also be noted that the conical seat 20 preferably extends outwardly from the sealing surface 28, as can best be seen in FIG. 2. This arrangement has been found particularly advantageous in minimizing, if not eliminating, any loss of sealing effect as the sealing surface 28 rotates relative to the seat 20 when the swivel is in use.

The tubular member 21 is provided with a shoulder 30 which is engaged by the flange of a nut 32 which is used in joining the two portions of the swivel. As will be seen in FIG. 2, the nut 32 is threaded onto an exteriorly threaded portion 34 of the swivel portion 10 thereby bringing the sealing surface 28 into sealing engagement with the seat 20 as the resilient conduit 24 is axially compressed. The sealing pressure is dependent upon the extent to which the nut 32 is threaded upon the portion 34 and can be maintained in a desired position by tightening the set screw 36 against the threaded portion 34.

When the two portions of the swivel are thus assembled, the passageways 18 and 22 are effectively joined in a manner preventing any leakage therefrom. The swivel portion 12 is free to rotate relative to the swivel portion 10 without any leakage of fluid from the joint passageway thus formed. Bearing surfaces 38, 39 are formed on the body of swivel portion 12 to each side of the shoulder 30. Lubricant grooves are formed intermediate the length of the bearing surfaces 38, 39. The bearing portions 38, 39 are guided by the inner surfaces of the nut 32 to maintain the two portions of the swivel in alignment. However, in use it is almost a certainty that the swivel portion 12 will be cocked relative to the portion 10. The seal between the sealing surface 28 and the seat 20 will, however, be unaffected.

There are two reasons to which this is attributable. First, the relatively low angle of the seat 20 and sealing surface 28 tends to "lock" the sealing member 26 against any cocking movement without in any way interfering with the ability of the sealing member 26 and swivel portion 12 to rotate relative to the swivel portion 10. Further, the spring pressure of the conduit 24 acts as a cushion which transmits little or no force to the sealing member 26 which would tend to cock it relative to the swivel portion 10 even though the swivel portion 12 were cocked to a considerable extent.

The reliability of this sealing system has been found most effective where internal pressures in the swivel vary. The sealing action is equally effective at low pressures as at high pressures and does not tend to leak at the low pressures as has been a problem of prior swivel connections.

Having thus described the invention what is claimed as novel and desired to be secured by Letters Patent of the United States is:

A swivel for connecting two fluid conduits and permitting relative rotation therebetween, said swivel comprising two portions adapted to be joined together, the first of said portions having a passageway therethrough with a conical seat at one end thereof which has an angle between 15° and 30° relative to the axis of its passageway, the other of said portions comprising a tubular body member, a resilient bellows-like conduit sealed at one end to said body member and extending therethrough, a sealing member sealed to the other end of said bellows-like conduit and having at its outer end a sealing surface matching and engageable with the seat of the first swivel portion, said conduit and said sealing member forming a passageway through said other swivel portion, the body member of said other swivel portion having an external shoulder intermediate its length, a nut telescoped over said body member and having a flange engageable with said shoulder, said first swivel portion having threads onto which said nut is threaded to join the two swivel portions in a manner permitting relative rotation therebetween, said nut being threaded upon said first swivel portion a distance sufficient to bring said sealing surface into engagement with said conical seat and axially compress said bellows-like conduit.

References Cited in the file of this patent

UNITED STATES PATENTS

| | | |
|---|---|---|
| 2,407,745 | Jacobson | Sept. 17, 1946 |
| 2,793,058 | Jacobson | May 21, 1957 |